United States Patent
Huntington

(10) Patent No.: US 9,821,266 B2
(45) Date of Patent: Nov. 21, 2017

(54) ROTATING BED DEVICE FOR THE SEPARATION BY ADSORPTION OF AT LEAST ONE CONSTITUENT OF A GASEOUS MIXTURE

(71) Applicant: Richard A. Huntington, Spring, TX (US)

(72) Inventor: Richard A. Huntington, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 44 days.

(21) Appl. No.: 15/157,462

(22) Filed: May 18, 2016

(65) Prior Publication Data

US 2017/0036159 A1    Feb. 9, 2017

Related U.S. Application Data

(60) Provisional application No. 62/201,692, filed on Aug. 6, 2015.

(51) Int. Cl.
*B01D 53/047* (2006.01)
*B01D 53/06* (2006.01)

(52) U.S. Cl.
CPC .......... *B01D 53/06* (2013.01); *B01D 53/047* (2013.01); *B01D 2259/40007* (2013.01); *B01D 2259/40062* (2013.01); *B01D 2259/40069* (2013.01)

(58) Field of Classification Search
CPC ............... B01D 53/047; B01D 53/06; B01D 2259/40007; B01D 2259/400062; B01D 2259/400069
USPC ......... 95/96, 97, 103, 107, 113; 96/116, 125
See application file for complete search history.

(56) References Cited

U.S. PATENT DOCUMENTS

| | | | |
|---|---|---|---|
| 4,452,612 A | 6/1984 | Mattia | 55/25 |
| 5,487,775 A * | 1/1996 | LaCava | B01D 53/047 95/107 |
| 6,176,897 B1 | 1/2001 | Keefer | 95/98 |
| 6,884,401 B2 | 4/2005 | Yang et al. | 423/240 |
| RE40,006 E | 1/2008 | Keefer et al. | 95/100 |
| 8,679,232 B2 | 3/2014 | Wolf et al. | 95/199 |
| 9,034,079 B2 | 5/2015 | Deckman et al. | 95/96 |
| 2003/0070550 A1 | 4/2003 | Keefer et al. | 96/125 |
| 2010/0089241 A1* | 4/2010 | Stoner | B01D 53/0446 96/125 |
| 2013/0333571 A1 | 12/2013 | Sundaram et al. | 96/115 |
| 2014/0076164 A1* | 3/2014 | Monereau | B01D 53/0473 96/109 |

* cited by examiner

*Primary Examiner* — Frank Lawrence
(74) *Attorney, Agent, or Firm* — ExxonMobil Upstream Research Company Law Department

(57) ABSTRACT

A pressure swing absorption apparatus, including: at least four beds that each include an absorbent material, wherein the at least four beds are configured to rotate and are grouped such that members of one group only have fluid interconnections with members of another group; and a control system that controls a flow rate of a fluid communication between at least two of the beds by adjusting a phase angle difference between the at least two of the beds.

21 Claims, 12 Drawing Sheets

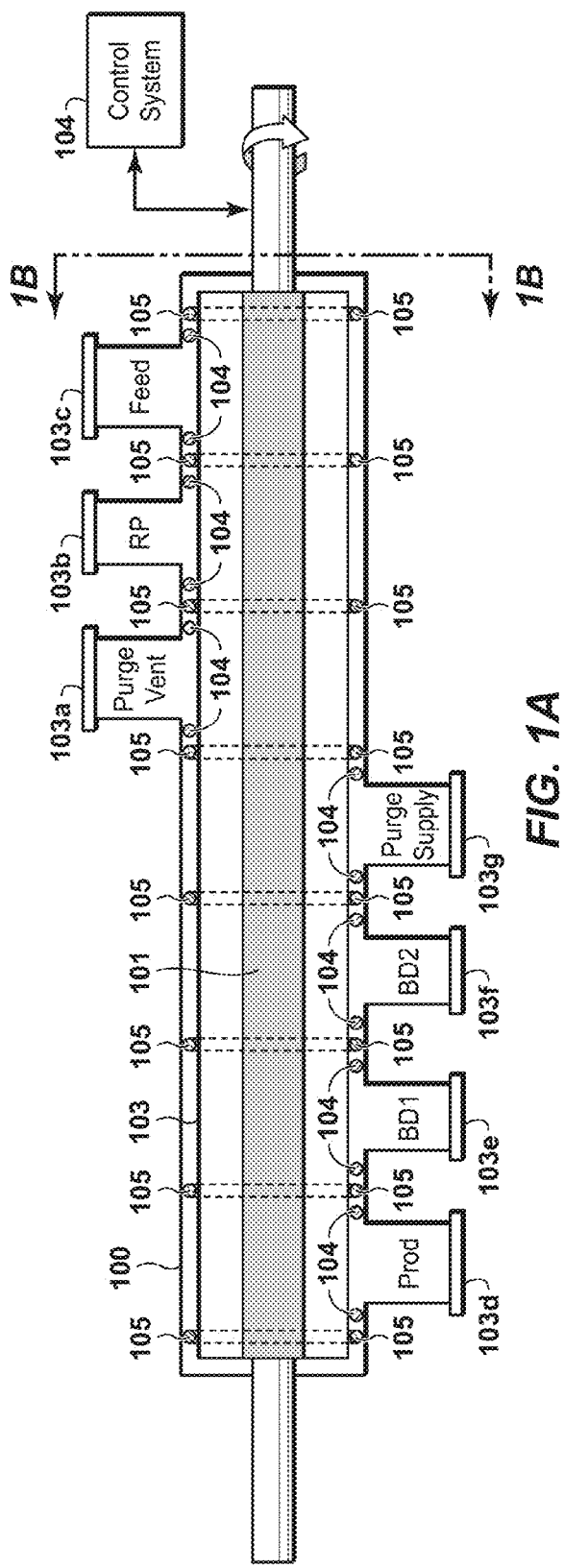
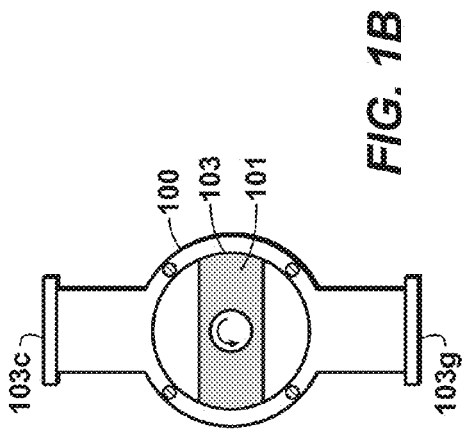
FIG. 1A
FIG. 1B

ROTATING BED DEVICE FOR THE SEPARATION BY ADSORPTION OF AT LEAST ONE CONSTITUENT OF A GASEOUS MIXTURE

CROSS-REFERENCE TO RELATED APPLICATIONS

This application claims the priority benefit of U.S. Patent Application 62/201,692 filed Aug. 6, 2015 entitled ROTATING BED DEVICE FOR THE SEPARATION BY ADSORPTION OF AT LEAST ONE CONSTITUENT OF A GASEOUS MIXTURE, the entirety of which is incorporated by reference herein.

TECHNOLOGICAL FIELD

Exemplary embodiments described herein pertain to separations conducted by pressure swing absorption (PSA). More particularly, exemplary embodiments described herein use an adjustable phase angle between groups of rotating beds.

BACKGROUND

This section is intended to introduce various aspects of the art, which may be associated with exemplary embodiments of the present technological advancement. This discussion is believed to assist in providing a framework to facilitate a better understanding of particular aspects of the present technological advancement. Accordingly, it should be understood that this section should be read in this light, and not necessarily as admissions of prior art.

Prior systems, methods and devices have been developed to separate unwanted constituents of a gaseous mixture using a pressure swing adsorption (PSA) process. This process generally comprises a feed step and a regeneration step. The feed step being one during which a feed gas, which is a mixture of at least two constituents, is passed over adsorptive media bed(s) to remove a more readily adsorbed constituent of the mixture from the remaining constituents that are less readily adsorbed. During regeneration, the more readily adsorbed constituent is removed from the bed(s) generally by pressure reduction, gas sweeping, purging or a combination of these. Generally, the feed step takes place at a substantially higher pressure than the regeneration step, hence the description of "pressure swing adsorption."

The adsorptive media is arranged in a bed of some architecture, such as a packed bed, coated ceramic monolith, coated foil, etc. and has a normal direction of flow through the bed from the feed side to the product side of the bed. The device comprises ports that may be alternately in communication with the bed or in communication with the bed in combinations. The ports comprise at least one feed port, at least one product port, at least one blow down port, at least one purge supply port and at least one purge vent port.

During the feed step, the feed port and the product port are in communication with the bed. The pressurized gaseous mixture containing one or more unwanted constituents flows from the feed port, through the bed in the normal direction of flow and passes over an adsorptive media to produce a pressurized product stream with a reduced amount of the unwanted constituents and this pressurized product stream flows out of the product port; the unwanted constituents being more readily adsorbed onto the adsorptive media than the other constituents.

In order to regenerate the adsorptive media, the unwanted constituents may be removed by a pressure swing process comprising the following steps: 1) stop flow from the feed port and out of the product port; 2) depressurize the bed in one or more steps to a lower pressure by flowing the residual gaseous mixture contained within the device to the blow down port that is then in communication with the bed and with flow in the normal direction across the bed such that the residual gaseous mixture leaving the blow down port has a reduced amount of the unwanted constituents to form a lean residual gas; 3) stop flow from the blow down port by stopping communication between the blow down port and the bed; 4) by some means store the lean residual gas for use in step (5) or as an alternative, this lean residual gas may be used concurrently without storage in another similar device; 5) open communication between the bed and the purge supply and the purge vent ports, the purge supply and purge vent ports being located such that the lean residual gas that flows into the device through the purge supply port passes through the bed in the anti-normal direction and leaves the device through the purge vent port as a rich residual gas.

As is normal with a pressure swing process, the lean residual gas, being at a lower pressure and possibly also a higher temperature than the feed gas, has a greater capacity to capture and remove the unwanted constituents from the adsorptive media to create the rich residual gas. The rich residual gas may be further conditioned and recycled to the feed gas, used in another process or disposed.

U.S. Pat. No. 4,452,612 (the entirety of which is hereby incorporated by reference), which will be referred to as Mattia, and U.S. Pat. No. RE40,006 E (a reissue of U.S. Pat. No. 6,063,161, the entirety of which is hereby incorporated by reference), which will be referred to as Keefer, describe the art of pressure swing adsorption using a plurality of adsorptive beds with a rotary valve arrangement to manage the feed and regeneration steps. Mattia describes the basic principles for pressure swing adsorption using rotary valves in which a plurality of adsorptive beds successively pass by several ports separated by baffles and seals to effect the feed, depressurization, desorption and re-pressurization steps of the process. Mattia describes the use of a plurality of beds that rotate at the same speed such that for example, depressurization of one bed may be used to purge and regenerate and the re-pressurize other beds. In this manner, the beds are interconnected to reduce the need for external compression and improve the efficiency of the pressure swing adsorption process.

Keefer builds on Mattia to further teach a method to control the pressure swing adsorption process in which pressure or flow control devices, such as control valves, orifices and the like, are included within the interconnecting lines between the beds. In this manner, the effective flow coefficient (Cv) of these interconnections may be adjusted to alter the time to complete a purge, depressurization, re-pressurization or similar sub-steps of the regeneration step. This ability to control the Cvs of these interconnections may be useful to adapt the pressure swing adsorption process to varying feed compositions, flow rates, turndown or other process variables.

SUMMARY

A method, including: using a pressure swing absorption apparatus to separate a feed gas mixture into at least a first component and a second component, wherein the first component is more readily absorbed under an increase in pressure relative to the second component which is less readily absorbed under the increase in pressure over an absorbent material included in the pressure swing absorption apparatus, and the pressure swing absorption apparatus includes at least four rotating beds of the absorbent material, the at least four beds are grouped such that members of one group only have fluid interconnections with members of another group; and controlling a flow rate of a fluid communication between at least two of the beds by adjusting a phase angle difference between the at least two of the beds.

In the method, the using can include using a pressure swing absorption apparatus that includes at least one rotary distributor valve for each group of beds.

In the method, the at least one rotary distributor valve per group can provide fluid interconnections to first and second ends of the absorbent material of the beds within a group for a feed stream, a product stream, and a purge stream, and the at least one rotary distributor valve per group can provide fluid interconnections to the absorbent material of the bed in another group for a blow-down stream and a purge supply stream.

The method can further include varying a cycle frequency so as to achieve at least one of a predetermined purity, recovery, or flow rate of the first component or the second component.

In the method, each group of beds can have an equal number of beds.

In the method, the controlling can exclude using a control valve or adjustable orifice to control flow rate.

In the method, the controlling step can include adjusting the phase angle difference from zero degrees to forty-five degrees.

In the method, the at least four beds can rotate with a same rotational speed.

In the method, the absorbent material of each of the at least four beds can be identical.

A pressure swing absorption apparatus, including: at least four beds that each include an absorbent material, wherein the at least four beds are configured to rotate and are grouped such that members of one group only have fluid interconnections with members of another group; and a control system that controls a flow rate of a fluid communication between at least two of the beds by adjusting a phase angle difference between the at least two of the beds.

In the apparatus, the at least four rotating beds can each be configured with a feed port that receives a feed gas mixture, and a product port that outputs a first component of the feed gas mixture.

In the apparatus, the at least four beds can be configured to separate the feed gas mixture into the first component and a second component.

In the apparatus, the absorbent material can more readily absorb the second component under an increase in pressure relative to the first component which is less readily absorbed under the increase in pressure.

The apparatus can further include at least one rotary distributor valve for each group of beds.

In the apparatus, the at least one rotary distributor valve per group can provide fluid interconnections to first and second ends of the absorbent material of the at least four beds within a group for a feed stream, a product stream, and a purge stream, and the at least one rotary distributor valve per group can provide fluid interconnections to the absorbent material of the bed in another group for a blow-down stream and a purge supply stream.

In the apparatus, each group of beds can have an equal number of beds.

In the apparatus, the control system can exclude a control valve or adjustable orifice to control flow rate.

In the apparatus, the control system can include a computer, and a drive system, controlled by the computer, that rotates the at least four beds at the same rotational speed, and the computer and drive system individually control the phase of each of the four beds.

In the apparatus, the control system includes a chain, belt, or synchronous belt drive system that drives a rotation of the at least four beds.

In the apparatus, the control system includes two or more idler cogs or sheaves that adjust a slack chain or slack belt in order to change a rotational speed of some of the at least four beds.

In the apparatus, the absorbent material of each of the at least four beds can be identical.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present technological advancement. Moreover, certain dimensions may be exaggerated to help visually convey such principles.

FIG. 1A illustrates an exemplary embodiment of a single bed rotary valve pressure swing absorption element.

FIG. 1B is a cross section view of the pressure swing absorption element in FIG. 1A.

DETAILED DESCRIPTION

Figure 2A:
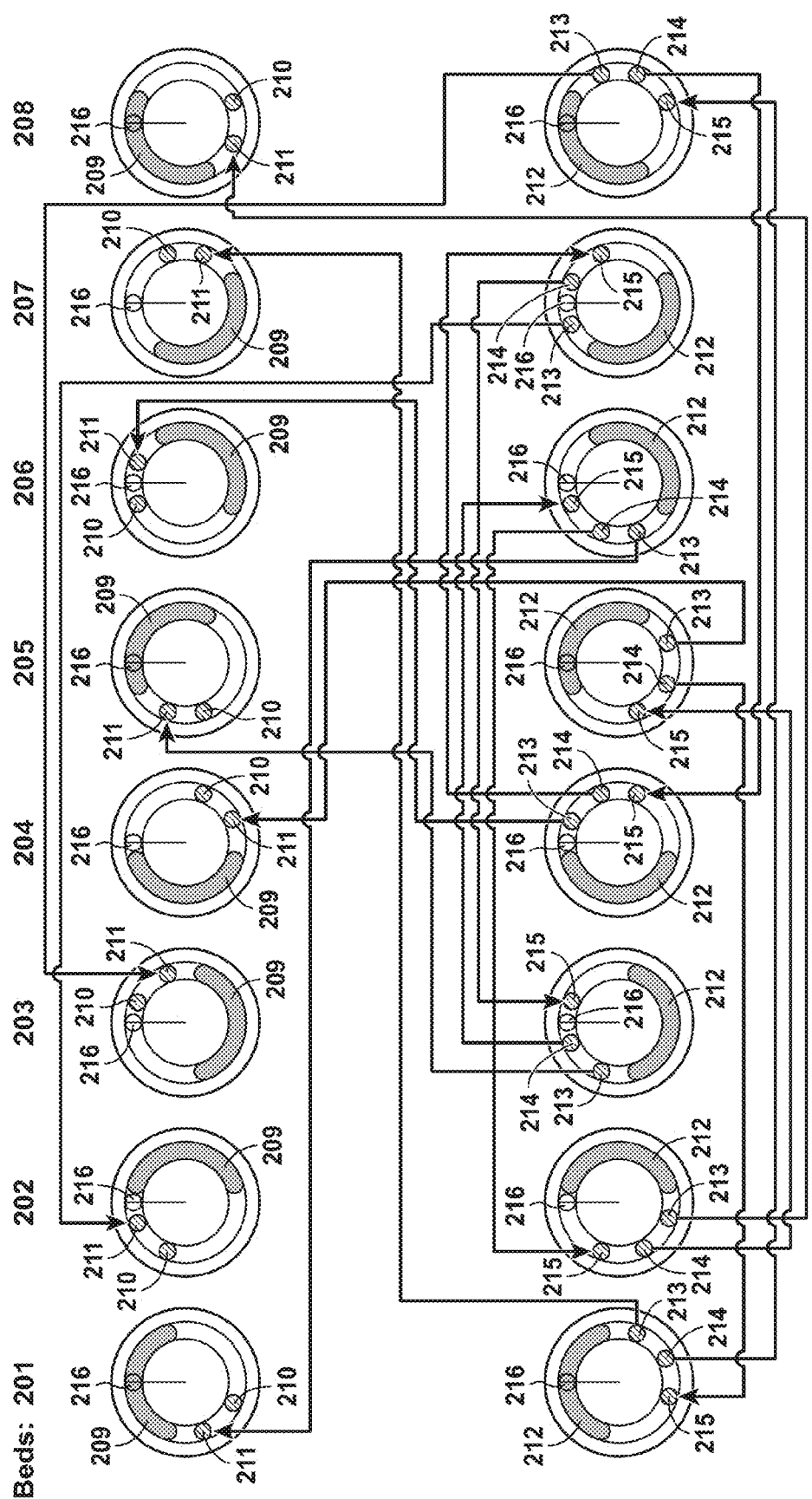
FIG. 2A illustrates interconnections for an eight-bed pressure swing absorption apparatus.
Figure 2B:
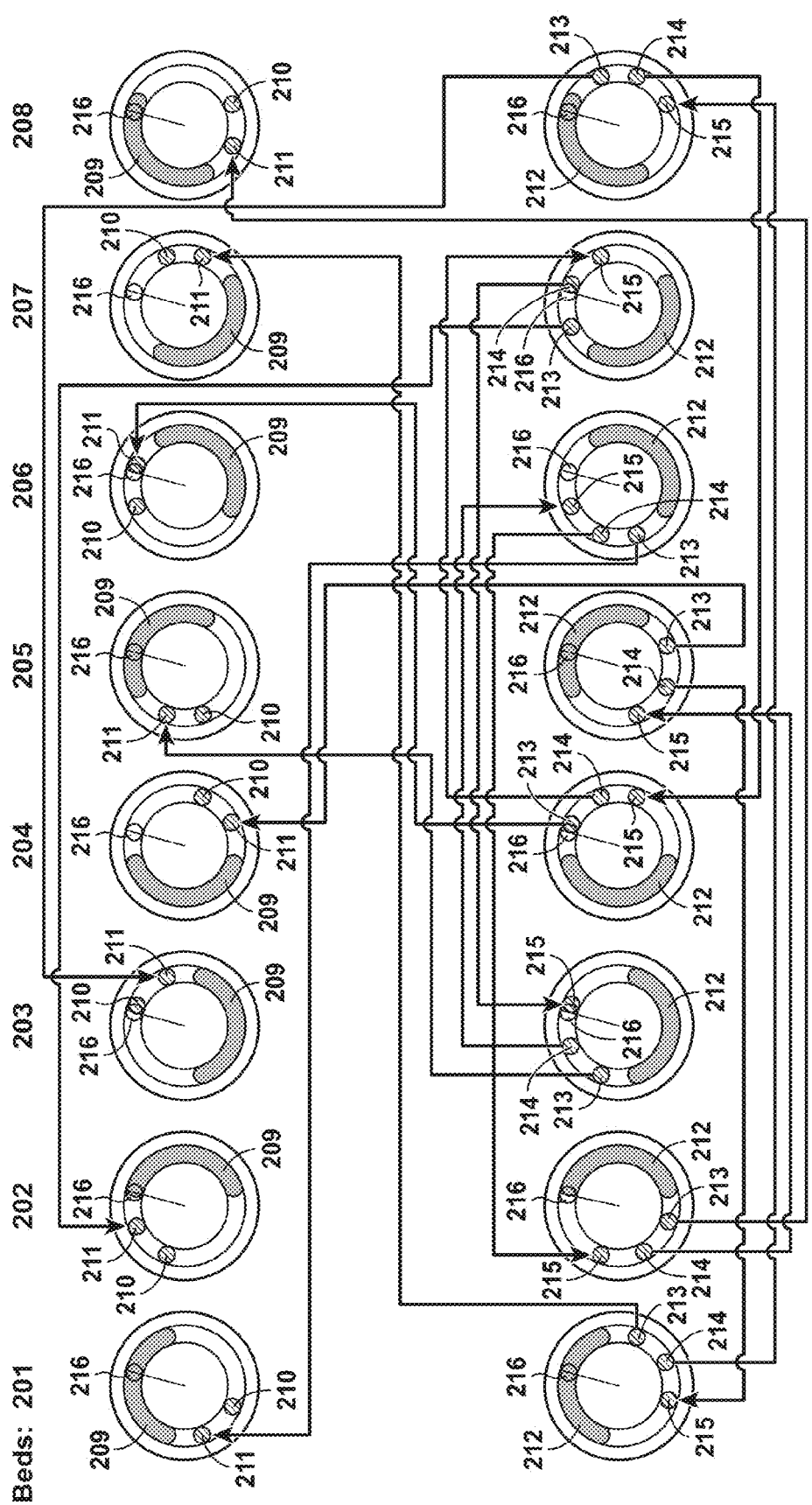
FIG. 2B illustrates the interconnections for an eight-bed pressure swing absorption apparatus when the valve openings have been rotated by 11.25 degrees relative to FIG. 2A.
Figure 2C:
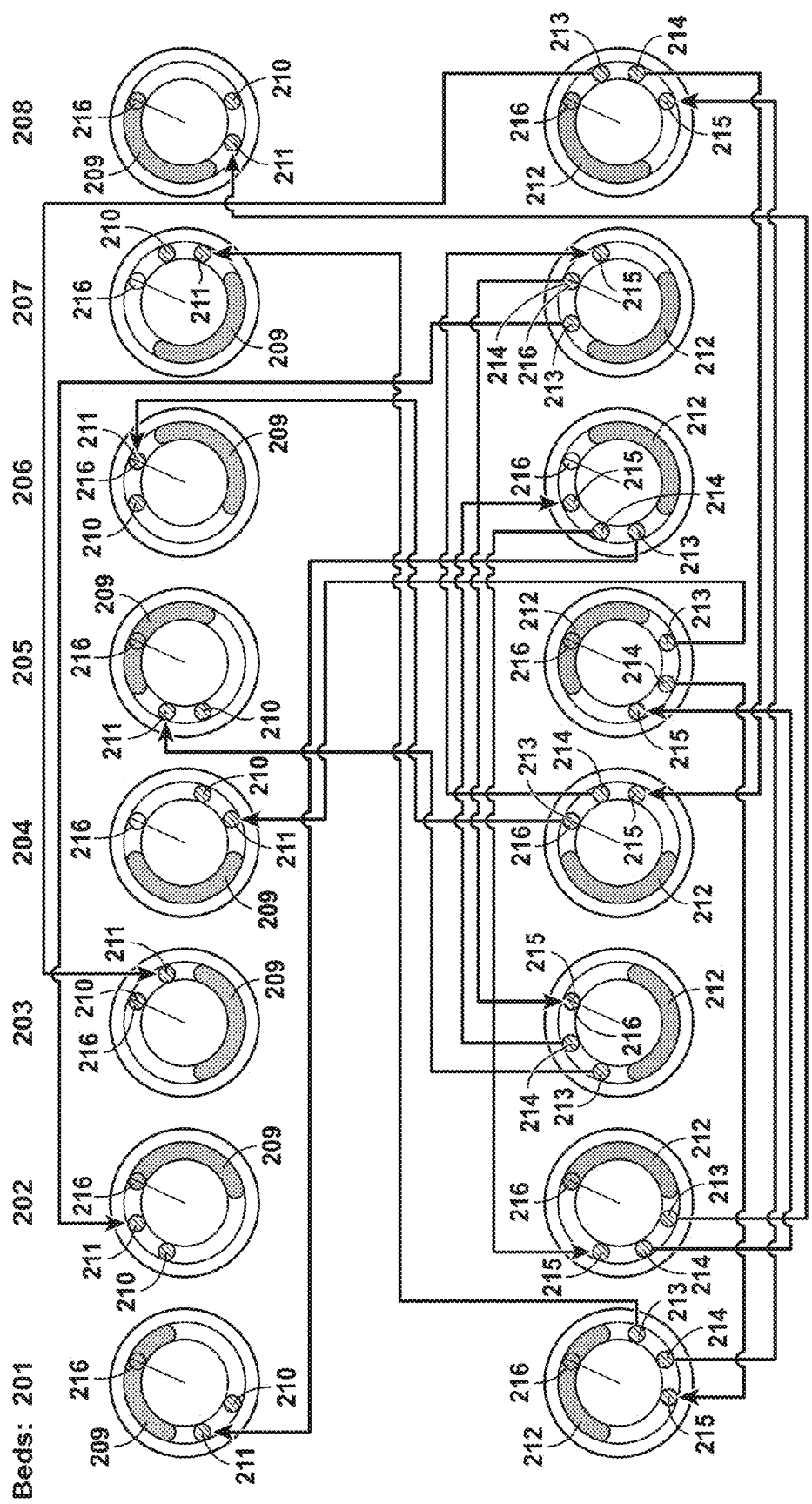
FIG. 2C illustrates the interconnections for an eight-bed pressure swing absorption apparatus when the valve openings have been rotated by 11.25 degrees relative to FIG. 2B.
Figure 2D:
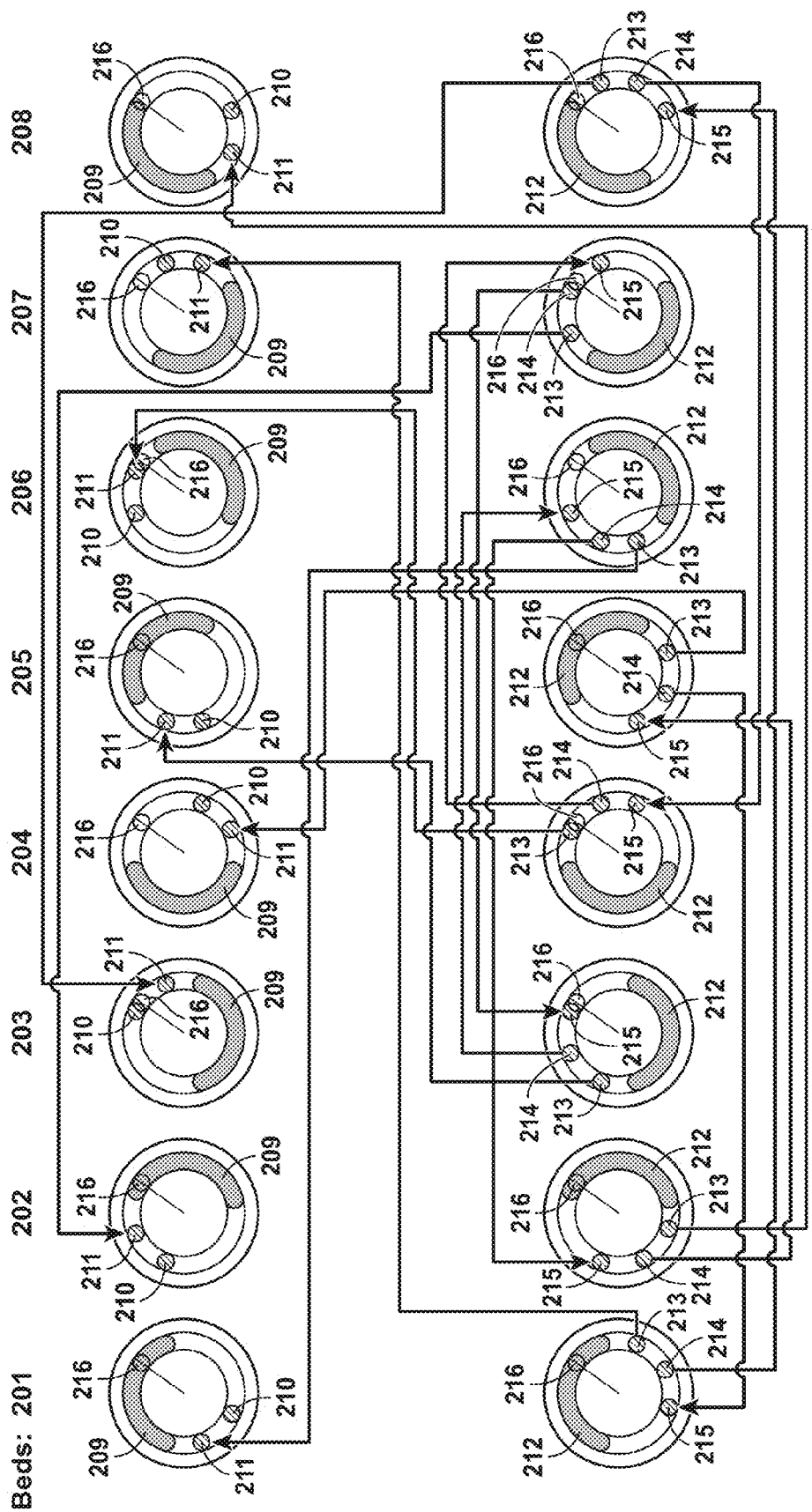
FIG. 2D illustrates the interconnections for an eight-bed pressure swing absorption apparatus when the valve openings have been rotated by 11.25 degrees relative to FIG. 2C.
Figure 2E:
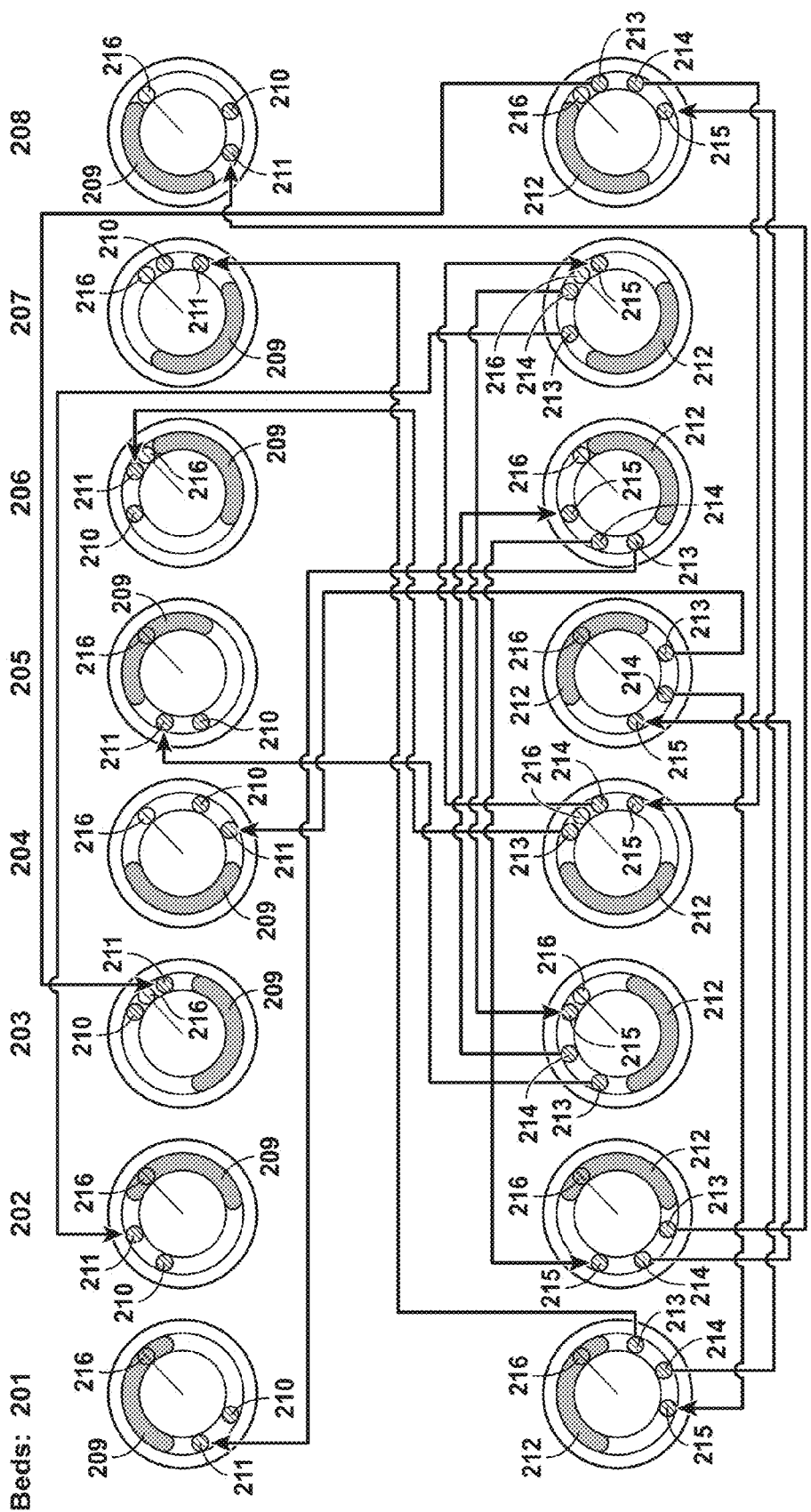
FIG. 2E illustrates the interconnections for an eight-bed pressure swing absorption apparatus when the valve openings have been rotated by 11.25 degrees relative to FIG. 2D.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present technological advancement. Moreover, certain dimensions may be exaggerated to help visually convey such principles.

The present technological advancement builds on Mattia and provides an alternative means versus Keefer to control the effective flow coefficient of the interconnections between the beds. Relative to the disclosure of Keefer, the present technological advancement does not require the addition of any control valves, orifices or similar components. On the contrary, in the exemplary embodiments of the present technological advancement, pressure swing adsorptive beds are arranged in a plurality of groups with rotary valves that control the flow through the various beds and control the feed and regeneration steps described above. The rotary valves for the plurality of groups rotate at similar or identical speeds, but as an improvement to Mattia and as an alternative to Keefer, the rotation of the rotary valves for the groups may be controlled so that an adjustable phase angle difference exists between the rotary valve or valves of one group beds and another group beds to alter the effective flow coefficient Cv of the interconnections between the various communicating beds.

FIGS. 1A and 1B (which is a sectional view of FIG. 1A, along the line 1B) illustrate an example of a single bed rotary valve PSA element. This example comprises a pressure vessel 100, a rotating adsorbent bed 101, a cylindrical rotary valve assembly 103 with ports (machined through the rotor shell to accommodate dehydration cycle requirements), and a control system 106. In FIG. 1A, element 104 is a port ring seal and element 105 is a circumferential ring. The cylindrical rotary valve assembly 103 includes feed 103c, product (Prod) 103d, a first blow down (BD1) 103e, a second blow down (BD2) 103f, re-pressurization (RP) 103b, purge supply 103g, and purge vent 103a on its stator component. During the feed step, the rotary valve 103 is aligned to open the feed port 103c and product port 103d to flow the feed gas into the feed port 103c, over the adsorbent bed 101 and out of the product port 103d. The more readily adsorbed constituent of the feed gas is adsorbed onto the adsorbent bed 101. The rotary valve 103 can be arranged to open the feed port 103c and product port 103d at the same time or open one port a short time before the other to manage the pressure within the device. In a preferred embodiment, the feed port 103c can be opened a short time before the product port 103d to cause the pressure within the device to increase to near the pressure of the feed gas prior to opening the product port 103d. At the completion of the feed step, the rotary valve 103 closes both the feed port 103c and product port 103d. Again, these may be synchronous closings or one port may be closed a short time prior to the other one.

Following, the feed step, a series of steps are used to regenerate the bed 101 so as to prepare it for a subsequent feed step. In this example, these steps include a first blow down, a second blow down, a purge, and a re-pressurization. Other steps may also be used and can include less or more blow down steps, and/or added purge and/or re-pressurization steps. The disposition and sources of gases for these steps can vary, but in a preferred embodiment, a plurality of similar adsorbent beds operating in a sequence of feed and regeneration steps are both the source and disposition for many of these regeneration steps.

An 8-bed example may be used to describe the fluid communications between the beds. In this 8-bed example, 8 similar adsorbent beds, which may be as shown in FIG. 1A, are sequenced in a cycle. The time to complete the cycle may be 8 units of time. At the start of an exemplary cycle, the first bed first opens its feed port, at approximately 1 unit of time later a second bed first opens its feed port, approximately 1 unit of time later a third bed first opens its feed port, etc. until 7 units of time after the first bed, the eighth bed first opens its feed port. In this manner, the cycles of the eight individual beds are staggered approximately equally. This provides for multiple beds to be in feed at the same time to ensure continuous feed to product flow.

Using this example 8-bed arrangement, interconnections between the individual beds may be provided to connect the first blow-down port of one bed to the re-pressurization port of another bed and the second blow-down port of one bed to the purge supply port of another bed. The interconnections are selected such that the timing of the first blow-down of each bed roughly coincides with the re-pressurization of its connected bed and the timing of the second blow-down of each bed roughly coincides with the purge of its connected bed. In this manner and for this 8-bed example, each bed is interconnected with four other beds. Those of ordinary skill in the art, in light of the present disclosure, will appreciate that with a different PSA feed and regeneration cycle arrangement, other numbers of beds may be similarly interconnected. Generally, an even number of beds is preferred and at least a total of four beds are required.

FIGS. 2A-2E illustrates the interconnections for the example 8-bed arrangement. In FIGS. 2A-2E, the eight beds 201-208 are symbolized by two rows of valves with a valve in the top row and one directly below it in the bottom row serving each bed. For example, with respect to bed 201, the valve in the top row and the corresponding valve in the bottom row can be part of a common rotary distributor valve, or constituted as two rotary distributor valves.

Two groups of beds can be arranged with one rotary valve servicing all beds in a group like in Keefer's FIG. 1 (but without the adjustable flow control valves). Then a phase angle between two rotary valves (two groups) controls the interconnection flow rates.

The ports in the top row include the feed port 209, purge vent (PVent) 210, and re-pressurization (RP) port 211. The ports in the bottom row include the product port 212, first blow-down (BD1) port 213, second blow-down (BD2) port 214 and the purge supply (PURGE) port 215. Flows from ports on the top valve to ports on the bottom valve indicate flows through the adsorptive bed in the normal direction of flow (direction of movement through absorptive bed generally from the feed port towards the product port). Flows from the ports on the bottom valve to ports on the top valve indicate flows through the adsorptive bed in the counter-normal direction of flow.

In order to show the sequence of the beds in the overall cycle, the top and bottom valves for the beds are rotated relative to bed 201. Bed 202 is rotated 90 degrees clockwise from Bed 201. Bed 203 is rotated 180 degrees clockwise from Bed 201 and Bed 204 is rotated 270 degrees from Bed 201. Similarly, Beds 205, 206, 207 and 208 are rotated 45, 135, 225 and 315 degrees clockwise relative to Bed 201, respectively. The intent with this arrangement is to provide continuous flow of product from feed; the depicted arrangement ensures that at least two beds have feed and product ports fully open at any given time. Continuous flow is only exemplary and not a requirement of the present technological advancement. FIGS. 2A-2E in no way proscribes a specific physical arrangement of the beds, rotary valves or ports, but rather simply illustrates an exemplary embodiment of the beds and their interconnections. Finally, the open circle and radial line 216 shown on each of the valves is used to illustrate the position of a valve opening. When the valve opening intersects the port in a rotary valve that is indicated by a solid shaded area, the port is in fluid communication with a connection external to the bed. For example, in FIG. 2A, the valve openings intersect the feed port 209 and product port 212 on Beds 201, 205 and 208. At this point in the cycle, the feed gas is flowing through these beds in the normal direction of flow from the feed port 209 to the product port 212. As a further example, in FIG. 2C, the valve openings intersect the feed port 209 and product port 212 of Beds 201, 202, 205, and 208, the valve openings intersect the purge supply 215 and purge vent ports 210 of Bed 203 and the second blow-down port 214 of Bed 207, and the valve openings intersect the first blow-down port 213 of Bed 204 and the re-pressurization port 211 of Bed 206. At the point in the cycle illustrated by FIG. 2C, feed gas is flowing through Beds 201, 202, 205, and 208 in the normal direction from the feed ports 209 to the product ports 212. In addition, gas from the second blow-down port 214 of Bed 207 fluidly communicates with the purge supply port 215 on Bed 203, which flows through Bed 203 in a counter normal direction to the purge vent port 210.

Still referring to the exemplary embodiment described FIGS. 2A-2E, each bed 201-208 is interconnected with four other beds as described above. Examination of the example in FIGS. 2A-2E shows that Beds 201, 202, 203, and 204 are only interconnected with Beds 205, 206, 207, and 208 and no interconnections exist among Beds 201, 202, 203, and 204 or among 205, 206, 207 and 208 (i.e., members of one group only have interconnections with members of another group). For other illustrative PSA cycles and bed arrangements, similar groupings of beds that are interconnected vs. groups that have no interconnections among their members can be used in accordance with the present technological advancement.

FIGS. 2A through 2E illustrate a partial sequence of the PSA cycle for the example 8-bed arrangement. It is noted that additional figures were filed with the provisional application, which this application claims the benefit of in the above-noted priority claim, which contain more images that illustrate the complete cycle.

With respect to FIGS. 2A through 2E, each subsequent figure shows a rotation of the valve opening 216 by 11.25 degrees for the top and bottom valves of each bed 201-208. The selection of an 11.25 degree interval for these images is completely arbitrary and serves only to illustrate the progress of the cycle. Referring to FIG. 2A and specifically to the purge supply 215 of bed 203 and the second blow-down 214 of bed 207, it is clear that both of these ports are fully closed and that no fluid communication exists between these ports. Progressing to FIG. 2B and these same ports, it is clear that both of the ports are similarly partially open and are now in partial fluid communication. Progressing to FIG. 2C and these same ports, it is clear that both of the ports are fully open and are now in full fluid communication. Progressing to FIG. 2D and these same ports, it is clear that both of the ports are partially open and are in partial fluid communication. Finally, progressing to FIG. 2E and these same ports, it is clear that both of the ports are closed and are not in fluid communication.

The same pattern may be observed between other interconnected ports of the various beds. For the arrangement illustrated in FIGS. 2A-2E with a round valve opening and round ports of a similar diameter, the various interconnecting ports are in at least a partial fluid communication for a period of slightly less than 45 degrees of rotation in these figures or about ⅛th of the full cycle. Those skilled in the art know that much flexibility exists in the shape of the ports and valve openings, including but not limited to round shapes of differing diameters, square and rectangular shapes, teardrop shapes, oval shapes, etc. The combination of differing shapes may be used to control the amount of overlap between the valve opening and a particular port and the effective Cv of the fluid communication between the interconnected ports. However, these shape choices affect only a fixed relationship between the effective Cv of an interconnection at a particular point in the PSA cycle and does not provide a means to adjust and control the effective Cv at that same point in the PSA cycle as external process conditions change. Keefer proposed to add control devices such as a control valve or orifice to adjust the effective Cv and perhaps to also adjust the duration of the fluid communications of the various interconnections.

Given the observation noted above that beds may be grouped into two or more groups and that among the members of each group no interconnections exist, it is possible to adjust the phase difference between these groups to adjust both the effective Cv of the various interconnections and the duration of the fluid communications of the various interconnections (i.e., controlling a phase angel between the rotation of a distributor valve of one group relative to the rotation of a distributor valve of another group).

Figure 3A:
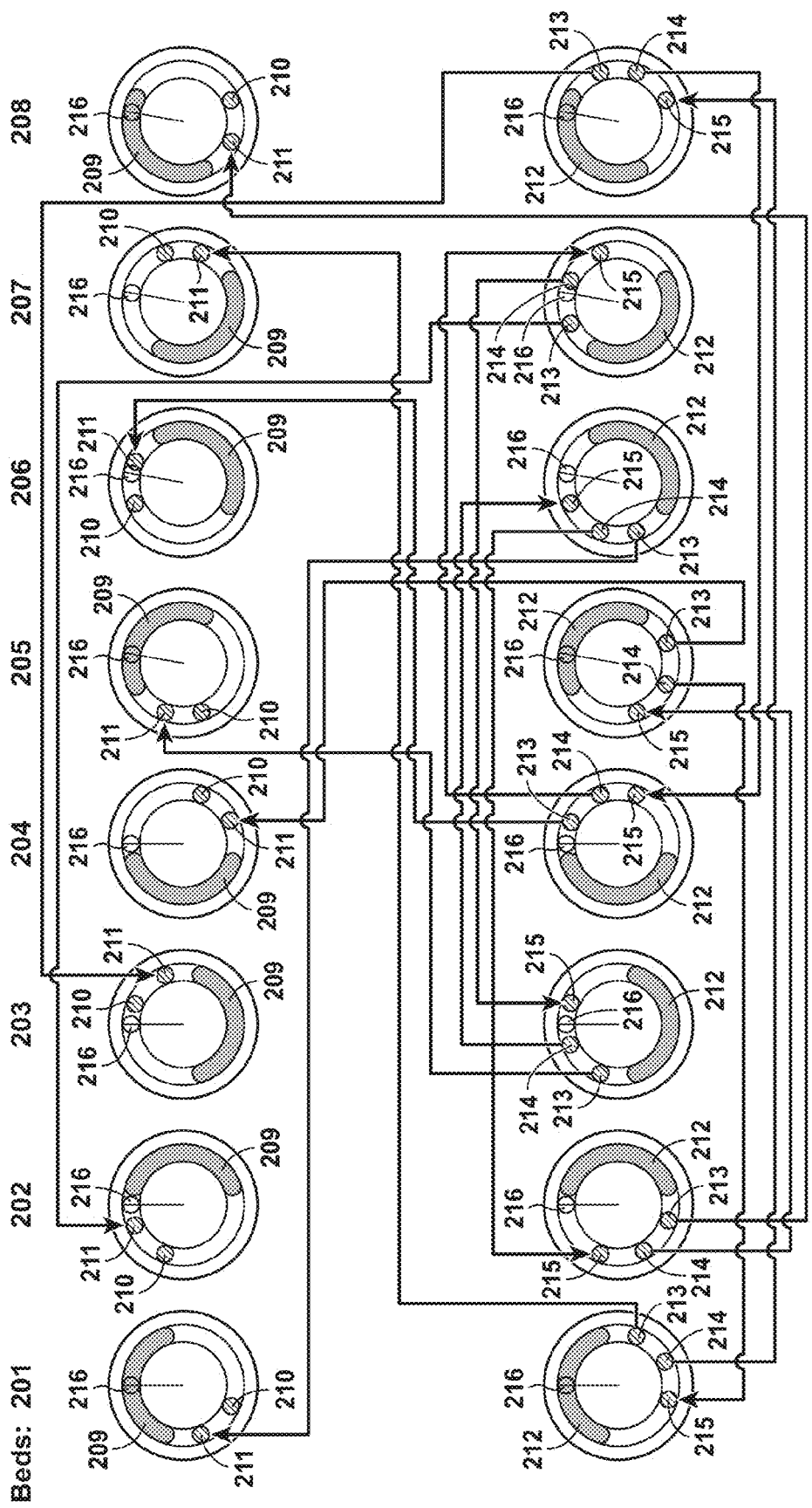
FIG. 3A illustrates interconnections for an eight-bed pressure swing absorption apparatus, wherein a phase difference between two groups of beds has been introduced.
Figure 3B:
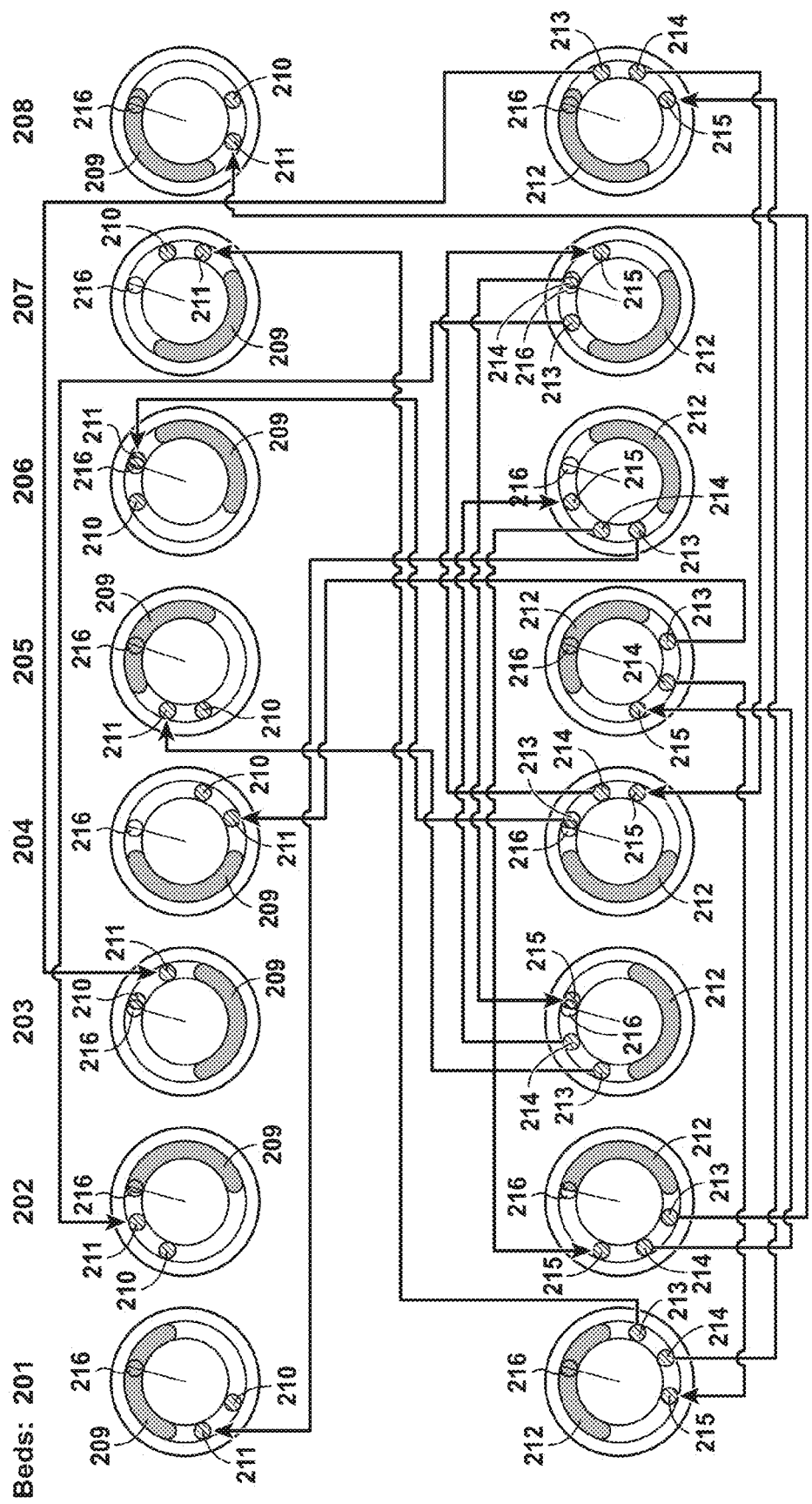
FIG. 3B illustrates the interconnections for an eight-bed pressure swing absorption apparatus when the valve openings have been rotated by 11.25 degrees relative to FIG. 3A.

FIGS. 3A-3E illustrate a sequence of valve opening that are each separated by 11.25 degrees in a manner similar to FIGS. 2A-2E, except that the valve opening angle of the top and bottom valves for Beds 205, 206, 207, and 208 is 7.5 degrees advanced vs. Beds 201, 202, 203, and 204 [i.e., a phase angle difference has been introduced between group 1 (Beds 201-204) and group 2 (Beds 205-208)]. FIGS. 3A-3B have omitted some reference numbers, but the various items in FIGS. 3A-3E are the same as those in FIGS. 2A-2E. FIGS. 3A-3E provide an example of the rotation of the beds being controlled to introduce an angular phase difference. It is noted that additional figures were filed with the provisional application, which this application claims the benefit of in the above-noted priority claim, which contain more images that illustrate the complete cycle.

Figure 3C:
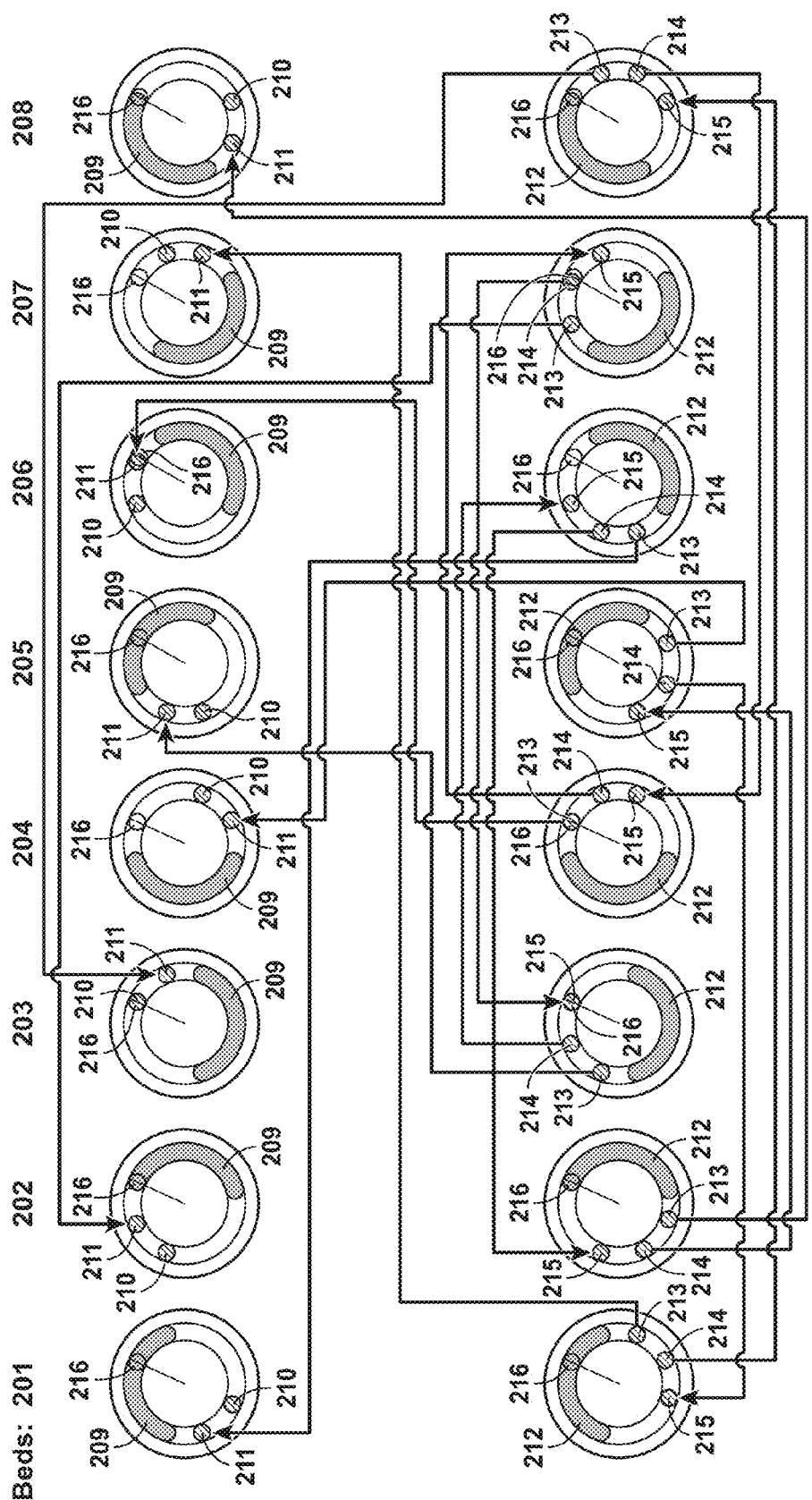
FIG. 3C illustrates the interconnections for an eight-bed pressure swing absorption apparatus when the valve openings have been rotated by 11.25 degrees relative to FIG. 3B.
Figure 3D:
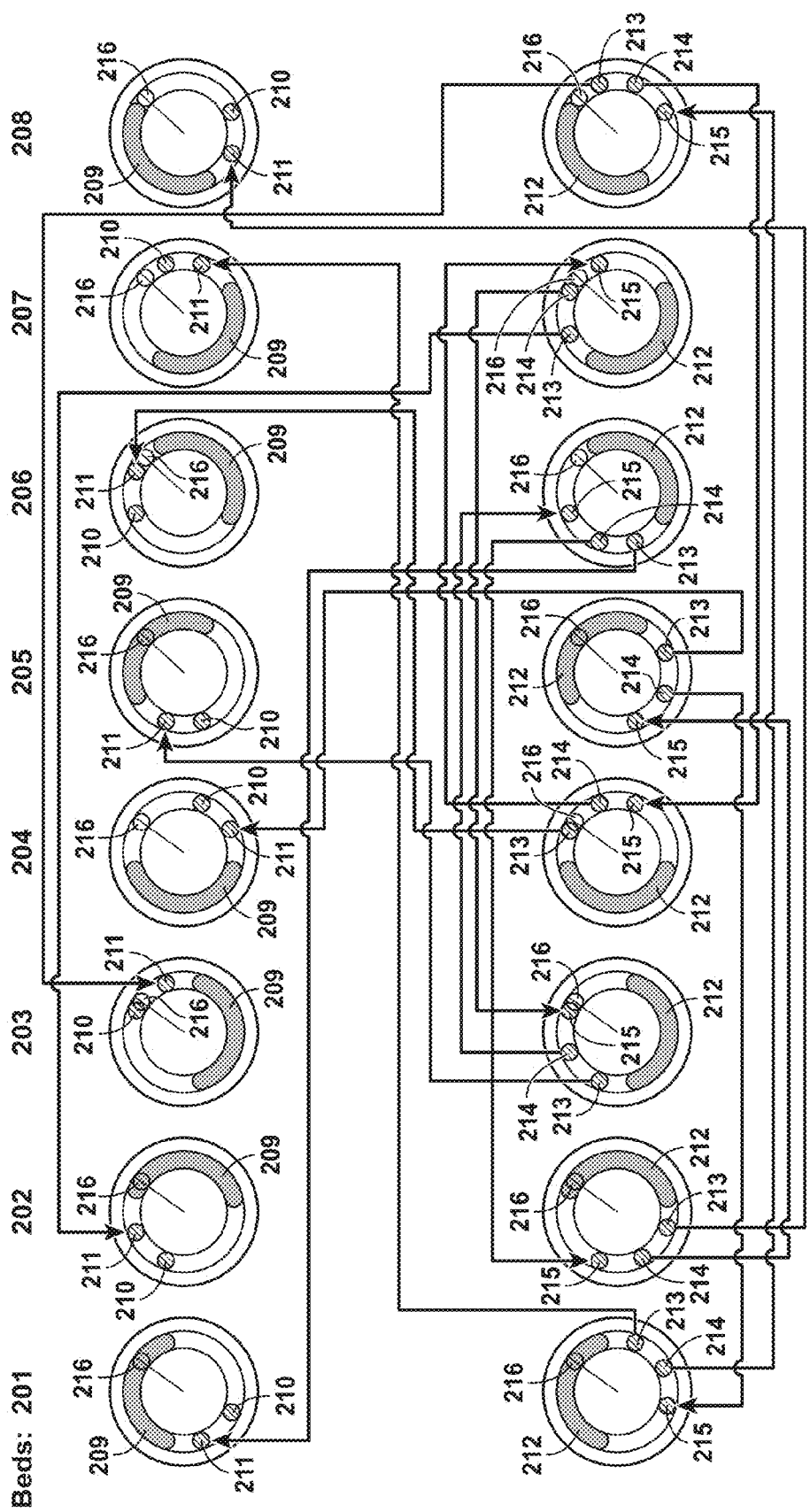
FIG. 3D illustrates the interconnections for an eight-bed pressure swing absorption apparatus when the valve openings have been rotated by 11.25 degrees relative to FIG. 3C.
Figure 3E:
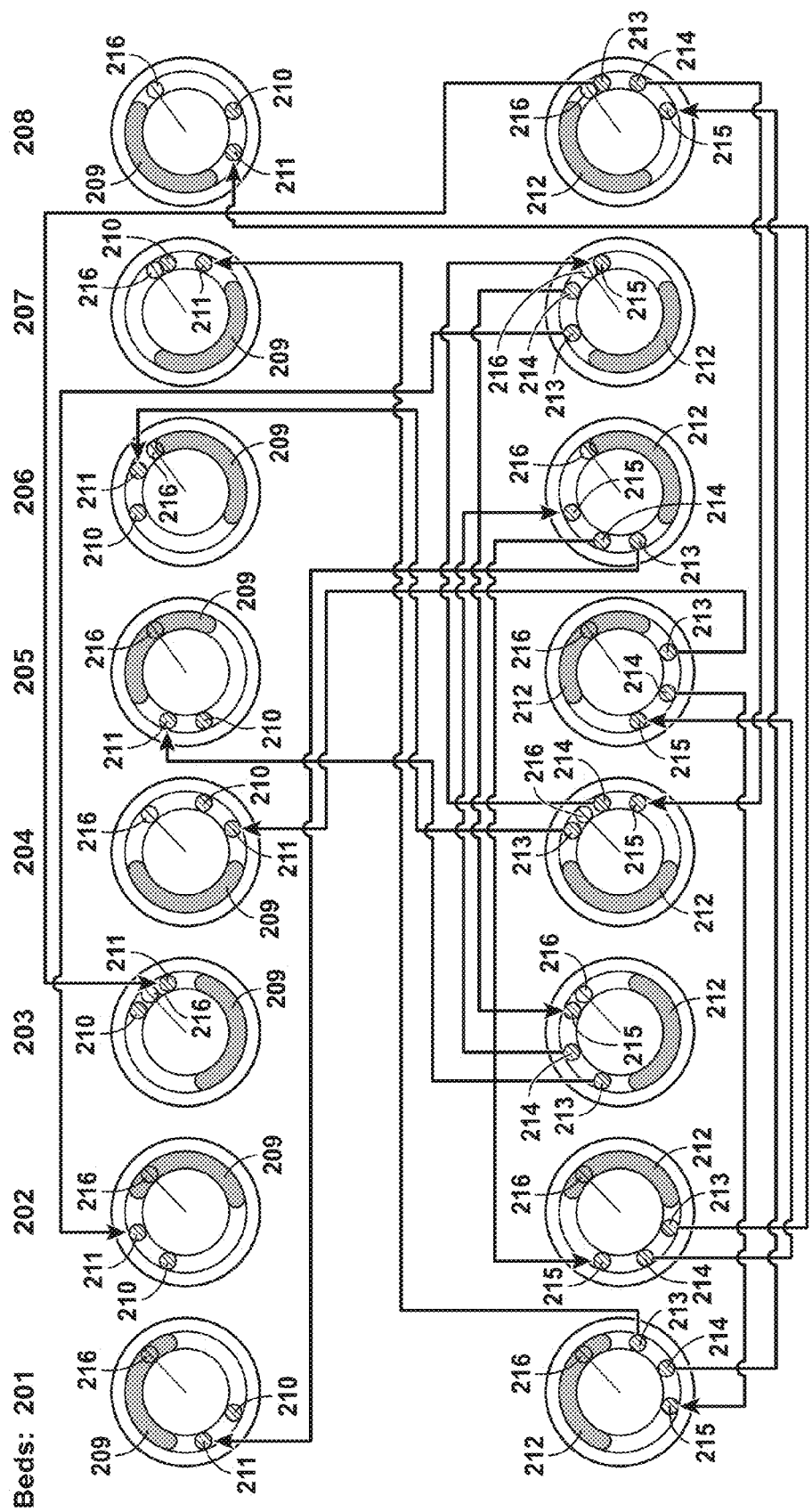
FIG. 3E illustrates the interconnections for an eight-bed pressure swing absorption apparatus when the valve openings have been rotated by 11.25 degrees relative to FIG. 3D.

The effect of this phase difference is two-fold. First, since the valve opening timing is no longer synchronized between the various beds, the effective Cv is reduced. To demonstrate this, observe the interconnection between the purge port 215 on Bed 203 and the second blow-down port 214 on Bed 207 in FIG. 3C. The purge port 215 on Bed 203 in FIG. 3C is fully open, however the connected second blow-down port 214 on Bed 207 is partially closed. Due to the phase difference, the various interconnecting ports are never fully open at the same time and so the effective Cv of the interconnection is reduced. Second, the period of fluid communication of the various interconnected ports is reduced by an amount of time or angle similar to the phase difference selected.

Returning to FIG. 1A, this figure illustrates a single adsorptive bed with a single rotary valve associated with only that bed. The PSA system depicted in FIGS. 2A-2E and 3A-3E would require eight beds similar to what is illustrated in FIG. 1 with a drive system or systems to rotate all eight beds at approximately the same rotational speed (or angular velocity) and with the ability to adjust the phase angle between the groupings of beds (i.e., Beds 201, 202, 203, and 204 vs. Beds 205, 206, 207, and 208 using FIG. 2A as an example). Difference in rotating speed between the two groups of beds are generally limited to periods when the difference in phase angle is being adjusted.

Control of the phase difference can be accomplished with a control system that includes a computer that is configured to control individual motors or similar drivers and a feedback control system that allows both the rotational frequency and timing or phase of each bed relative to a reference to be individually controlled by the computer system. The control system could also include a chain, belt or synchronous belt drive system may be provided to drive the rotational speed of all of the beds with the inclusion of two or more idler cogs or sheaves that can adjust the slack chain or slack belt before or after the Beds 205, 206, 207 and 208. By increasing the slack chain or belt ahead of these beds, the timing of their valve openings may be advanced vs. Beds 201, 202, 203, and 204. By decreasing the slack, the opposite effect is achieved.

While the beds of a multi-bed system are similar, they are not necessarily identical. Rather, the absorbent material could vary amongst the beds, different port shapes/openings could be used amongst the beds, or other structural differences could exist as long as the each of the beds embodies the present technological advancement.

U.S. Pat. No. 9,034,079 (hereinafter Deckman) includes further details about the swing absorption process, which is hereby incorporated by reference in its entirety. Deckman describes examples of absorbent material arranged in a bed or contactor, and a process flow useable with the present technological advancement.

Figure 4:
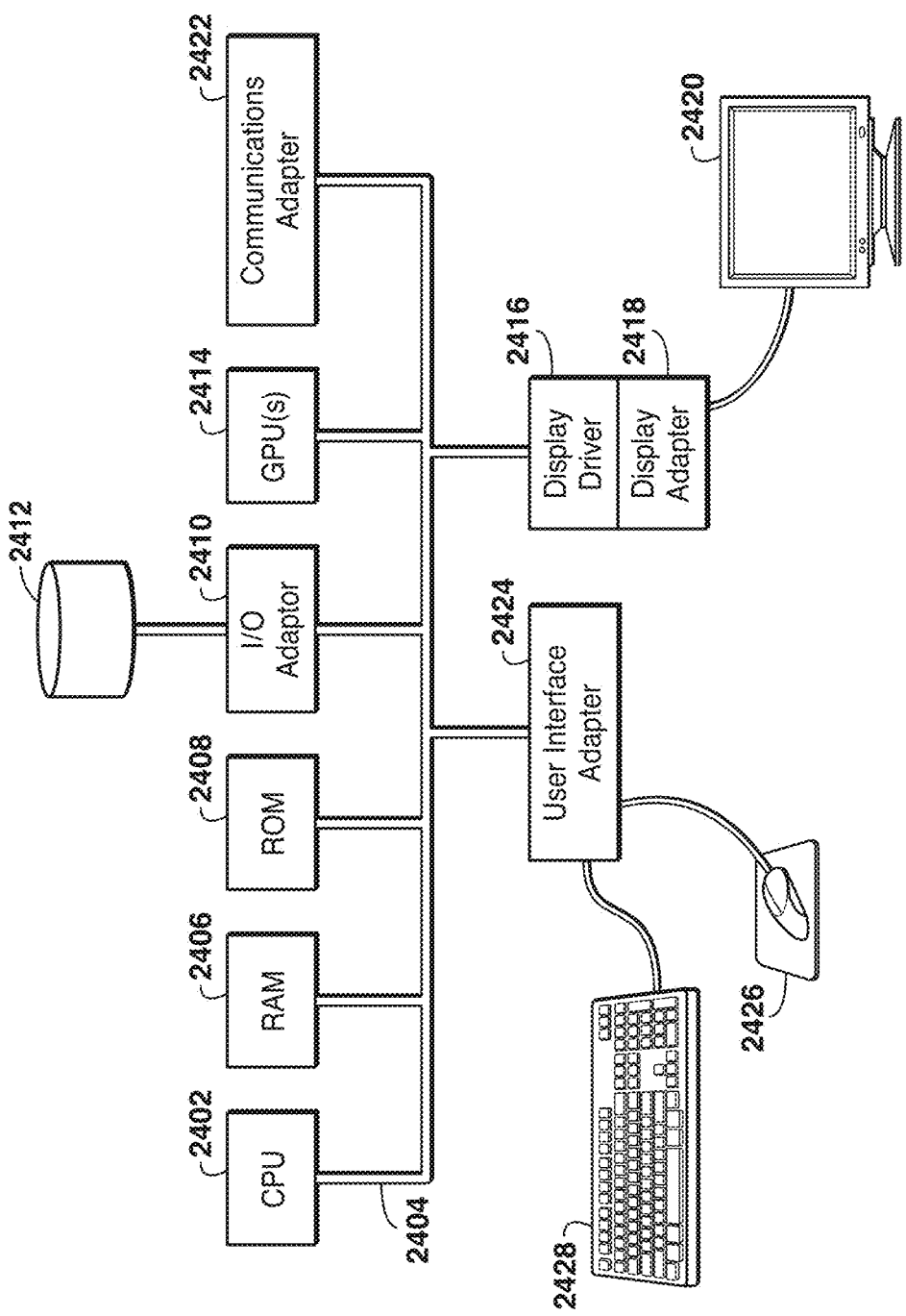
FIG. 4 illustrates an exemplary computer system useable to control the pressure swing absorption apparatuses described herein.

FIG. 4 illustrates an exemplary computer system useable with the pressure swing absorption apparatuses described herein. The computer system can be included in a control system that is configured to adjust the phase difference between the interconnected groups of beds in order to facilitate control of the flow rates of the various fluid communications offered by the interconnected ports. Maximum flow rates and periods of fluid communication are provided when the phase of the groups is synchronized (i.e., effectively a zero phase angle between the distributor valves). This zero phase angle provides the largest effective Cv for the interconnections. Based largely on the shapes selected for the valve openings and ports, the effective Cv is reduced as the phase angle is increased. For the shape shown in the examples of FIGS. 2A-2E and 3A-3E (i.e., circle), a phase difference of 45 degrees results in zero overlap between the interconnecting ports of the groups of beds and so effectively a Cv of zero and no fluid connection between these ports. For this example, the phase angle may be adjusted from 0 to 45 degrees to change the effective Cv of the interconnections from a maximum value determined by the shape and size of the valve openings, ports and interconnecting piping or passages to essentially a zero Cv. This adjustment range is affected by the shape and size of the valve openings and ports, by the number of interconnections in the actual PSA cycle and the number interconnected beds. It should be expected, that with a fewer number of regeneration steps and fewer required interconnected beds, the allowable adjustment range of the phase angle will increase. Conversely, with more regeneration steps and a greater number of required beds to be interconnected, the allowable adjustment range of the phase angle will decrease.

FIG. 4 illustrates computer system 2400 that can be used to control the phase angle. A central processing unit (CPU) 2402 is coupled to system bus 2404. The CPU 2402 may be any general-purpose CPU, although other types of architectures of CPU 2402 (or other components of exemplary system 2400) may be used as long as CPU 2402 (and other components of system 2400) supports the operations as described herein. Those of ordinary skill in the art will appreciate that, while only a single CPU 2402 is shown in FIG. 3, additional CPUs may be present. Moreover, the computer system 2400 may comprise a networked, multi-processor computer system that may include a hybrid parallel CPU/GPU system. The CPU 2402 may execute the various logical instructions according to various teachings disclosed herein. For example, the CPU 2402 may execute machine-level instructions for performing processing according to the operational flow described.

The computer system 2400 may also include computer components such as nontransitory, computer-readable media. Examples of computer-readable media include a random access memory (RAM) 2406, which may be SRAM, DRAM, SDRAM, or the like. The computer system 2400 may also include additional non-transitory, computer-readable media such as a read-only memory (ROM) 2408, which may be PROM, EPROM, EEPROM, or the like. RAM 2406 and ROM 2408 hold user and system data and programs, as is known in the art. The computer system 2400 may also include an input/output (I/O) adapter 2410, GPUs 2414, a communications adapter 2422, a user interface adapter 2424, display driver 2416, and a display adapter 2418.

The I/O adapter 2410 may connect additional non-transitory, computer-readable media such as a storage device(s) 2412, including, for example, a hard drive, a compact disc (CD) drive, a floppy disk drive, a tape drive, and the like to computer system 2400. The storage device(s) may be used when RAM 2406 is insufficient for the memory requirements associated with storing data for operations of the present techniques. The data storage of the computer system 2400 may be used for storing information and/or other data used or generated as disclosed herein. For example, storage device(s) 2412 may be used to store configuration information or additional plug-ins in accordance with the present techniques. Further, user interface adapter 2424 couples user input devices, such as a keyboard 2428, a pointing device 2426 and/or output devices to the computer system 2400. The display adapter 2418 is driven by the CPU 2402 to control the display on a display device 2420 to, for example, present information to the user regarding available plug-ins.

The architecture of system 2400 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 2400 may include various plug-ins and library files. Input data may additionally include configuration information.

The present technological advancement can be used to perform, in each absorbent bed, the following sequentially repeated steps within a cycle period (when the pressure is cycled between the lower and higher pressures at a cyclic frequency):

A) supplying a flow of the feed stream mixture at the higher pressure through a distributor valve to the first end of the adsorbent bed during a feed time interval, withdrawing gas enriched in the second component from the second end of the adsorbent bed, and delivering a portion of the gas enriched in the second component as a product stream;

(B) withdrawing a flow of gas enriched in the second component as light reflux gas (the more volatile component of the feed stream) from the second end of the adsorbent bed through a distributor valve, so as to depressurize the adsorbent bed from the higher pressure toward an equalization pressure less than the higher pressure, while adjusting the phase angle so that the pressure in the bed approaches the equalization pressure within an equalization time interval;

(C) withdrawing a flow of light reflux gas enriched in the second component from the second end of the adsorbent bed through the a distributor valve, so as to depressurize the adsorbent bed from approximately the equalization pressure to an intermediate pressure less than the equalization pressure and greater than the lower pressure, while adjusting the phase angle so that the pressure in the bed reaches approximately the intermediate pressure within a co-current blow-down time interval;

(D) withdrawing a flow of gas enriched in the first component from the first end of the adsorbent bed through a distributor valve, so as to depressurize the adsorbent bed from approximately the intermediate pressure to approach the lower pressure, while adjusting the phase angle so that the pressure in the bed approaches the lower pressure within a countercurrent blow-down time interval;

(E) returning a low of light reflux gas enriched in the second component from a distributor valve to the second end of the adsorbent bed at substantially the lower pressure, while withdrawing gas enriched in the first component from the first end of the adsorbent bed and through a distributor valve over a purge time interval, said flow of gas enriched in the second component from a distributor valve being withdrawn from an adsorbent bed of another group and which is undergoing co-current blow-down step (C) of the process;

(F) returning a flow of light reflux gas enriched in the second component from a distributor valve to the bed, so as to re-pressurize the adsorbent bed from approximately the lower pressure to approach the equalization pressure, while adjusting the phase angle so that the pressure in the bed approaches the equalization pressure within an equalization time interval, said flow of gas enriched in the second component from the second a distributor valve being withdrawn from an adsorbent bed of another group and which is undergoing equalization step (B) of the process;

(G) admitting gas to the adsorbent bed, so as to further re-pressurize the adsorbent bed from the equalization pressure toward the higher pressure, while controlling the flow so that the presence in the bed approaches the higher pressure within a re-pressurization time interval; and (H) cyclically repeating steps (A) to (G).

The foregoing description is directed to particular example embodiments of the present technological advancement. It will be apparent, however, to one skilled in the art, that many modifications and variations to the embodiments described herein are possible. All such modifications and variations are intended to be within the scope of the present invention, as defined in the appended claims. As will be obvious to the reader who works in the technical field, the present technological advancement is intended to be fully automated, or almost fully automated, using a computer programmed in accordance with the disclosures herein.

What is claimed is:

1. A method, comprising:
   using a pressure swing absorption apparatus to separate a feed gas mixture into at least a first component and a second component, wherein
   the first component is more readily absorbed under an increase in pressure relative to the second component which is less readily absorbed under the increase in pressure over an absorbent material included in the pressure swing absorption apparatus, and
   the pressure swing absorption apparatus includes at least four rotating beds of the absorbent material, the at least four beds are grouped such that members of one group only have fluid interconnections with members of another group; and
   controlling a flow rate of a fluid communication between at least two of the beds by adjusting a phase angle difference between the at least two of the beds.

2. The method of claim 1, wherein the using includes using a pressure swing absorption apparatus that includes at least one rotary distributor valve for each group of beds.

3. The method of claim 2, wherein the at least one rotary distributor valve per group provides fluid interconnections to first and second ends of the absorbent material of the beds within a group for a feed stream, a product stream, and a purge stream, and the at least one rotary distributor valve per group providing fluid interconnections to the absorbent material of the bed in another group for a blow-down stream and a purge supply stream.

4. The method of claim 1, further comprising varying a cycle frequency so as to achieve at least one of a predetermined purity, recovery, or flow rate of the first component or the second component.

5. The method of claim 1, wherein each group of beds has an equal number of beds.

6. The method of claim 1, wherein the controlling excludes using a control valve or adjustable orifice to control flow rate.

7. The method of claim 1, wherein the controlling step includes adjusting the phase angle difference from zero degrees to forty-five degrees.

8. The method of claim 1, wherein the at least four beds rotate with a same rotational speed.

9. The method of claim 1, wherein the absorbent material of each of the at least four beds is identical.

10. A pressure swing absorption apparatus, comprising:
    at least four beds that each include an absorbent material, wherein the at least four beds are configured to rotate and are grouped such that members of one group only have fluid interconnections with members of another group; and
    a control system that controls a flow rate of a fluid communication between at least two of the beds by adjusting a phase angle difference between the at least two of the beds.

11. The pressure swing apparatus of claim 10, wherein the at least four rotating beds are each configured with a feed port that receives a feed gas mixture, and a product port that outputs a first component of the feed gas mixture.

12. The pressure swing apparatus of claim 10, wherein the at least four beds are configured to separate the feed gas mixture into the first component and a second component.

13. The pressure swing apparatus of claim 12, wherein the absorbent material more readily absorbs the second component under an increase in pressure relative to the first component which is less readily absorbed under the increase in pressure.

14. The pressure swing apparatus of claim 10, further comprising at least one rotary distributor valve for each group of beds.

15. The pressure swing apparatus of claim 14, wherein the at least one rotary distributor valve per group provides fluid interconnections to first and second ends of the absorbent material of the at least four beds within a group for a feed stream, a product stream, and a purge stream, and the at least one rotary distributor valve per group providing fluid interconnections to the absorbent material of the bed in another group for a blow-down stream and a purge supply stream.

16. The pressure swing apparatus of claim 10, wherein each group of beds has an equal number of beds.

17. The pressure swing apparatus of claim 10, wherein the control system excludes a control valve or adjustable orifice to control flow rate.

18. The pressure swing apparatus of claim 10, wherein the control system includes a computer, and a drive system, controlled by the computer, that rotates the at least four beds at the same rotational speed, and the computer and drive system individually control the phase of each of the four beds.

19. The pressure swing apparatus of claim 10, wherein the control system includes a chain, belt, or synchronous belt drive system that drives a rotation of the at least four beds.

20. The pressure swing apparatus of claim 19, wherein the control system includes two or more idler cogs or sheaves that adjust a slack chain or slack belt in order to change a rotational speed of some of the at least four beds.

21. The pressure swing apparatus of claim 10, wherein the absorbent material of each of the at least four beds is identical.

* * * * *